United States Patent [19]

Dunbar

[11] 4,406,338
[45] Sep. 27, 1983

[54] WEIGHT CART

[76] Inventor: Glenn G. Dunbar, 2608 Overbrook, Toledo, Ohio 43614

[21] Appl. No.: 346,137

[22] Filed: Feb. 5, 1982

[51] Int. Cl.³ .................. G01G 19/52; G01G 19/00; G01L 25/00
[52] U.S. Cl. .................................. 177/50; 177/145; 73/1 B
[58] Field of Search .................. 177/50, 145; 73/1 B

[56] References Cited
U.S. PATENT DOCUMENTS 4,048,843 9/1977 Dunbar ........................ 73/1 B
4,249,633 2/1981 Dunbar ........................ 73/1 B X
4,347,904 9/1982 Dunbar ........................ 177/50

Primary Examiner—George H. Miller, Jr.
Attorney, Agent, or Firm—Emch, Schaffer & Schaub Co.

[57] ABSTRACT

A scale testing cart for transporting and positioning weights to effect the calibration of a platform scale is disclosed. The cart includes a frame with two opposed wheels located at one end of the frame. A rotatable driven wheel is located at the opposite end of the frame for steering and driving said cart. A hydraulically operated lifting hook is provided on the frame for engaging and lifting said scale testing weights.

12 Claims, 7 Drawing Figures

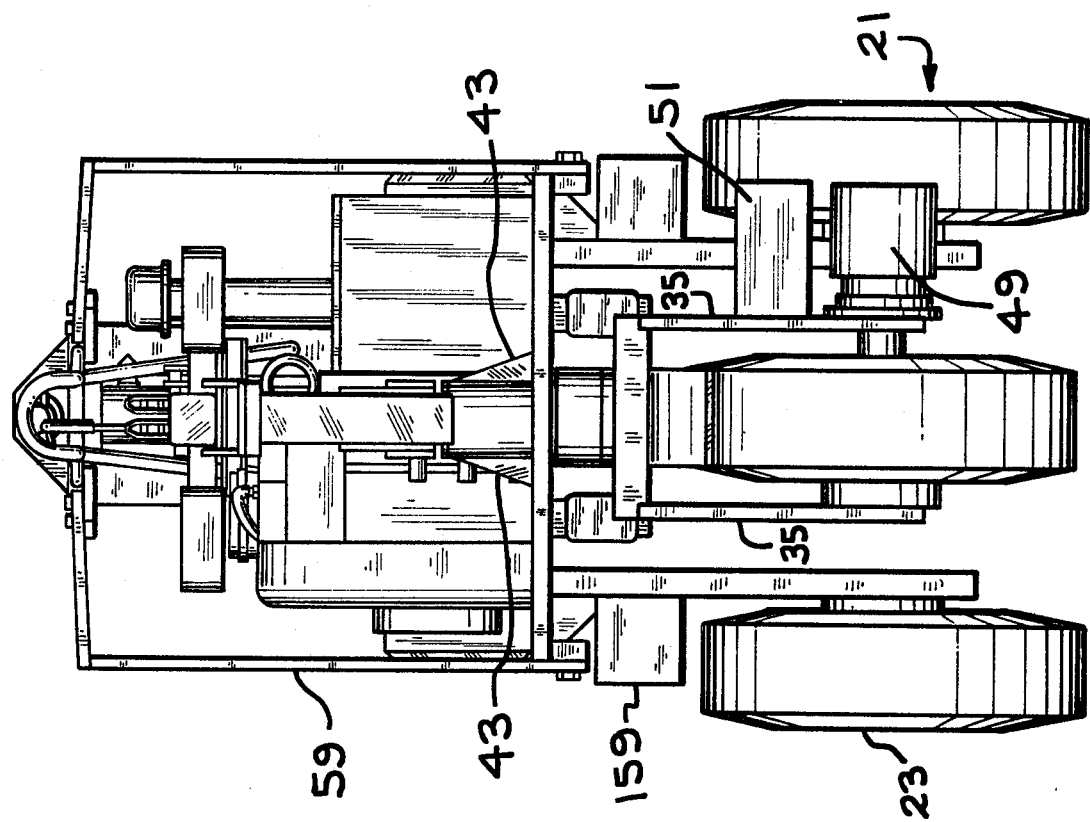
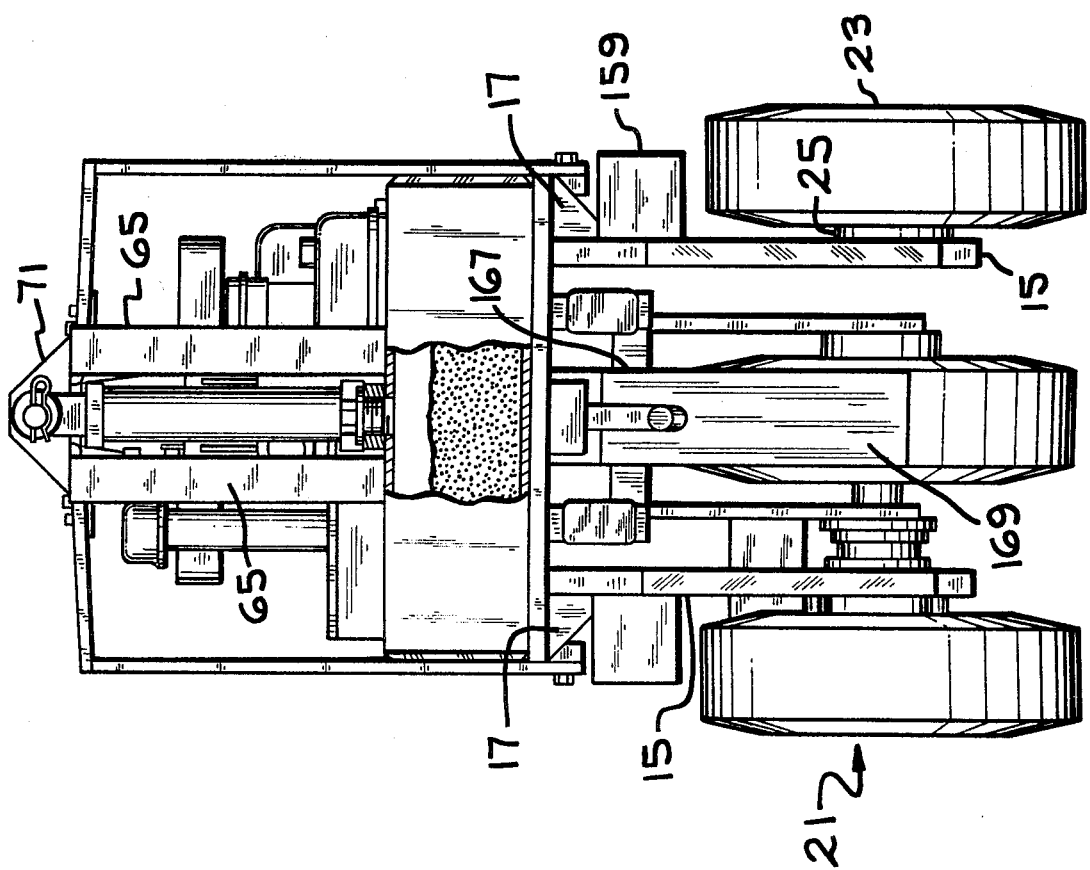

WEIGHT CART

BACKGROUND OF THE INVENTION

The invention relates to a weight cart for transporting scale testing weights. More particularly the weight cart is a compact three-wheel vehicle that is easily maneuvered by an operator to position the scale testing weights in the desired location.

Platform scales are well known in the art and are utilized for many purposes. For example, platform type scales are used in commercial grain operation for measuring the amount of grain brought to an elevator. In addition, such scales are frequently used to weigh livestock in the food industry. State governments also utilize platform scales in their vehicle limit inforcement program to determine if semi-trailer and tractor units are complying with their highway load limits.

The scales may be either mechanical or electrical scales. In either event, the scales often have a plurality of individual scale platforms, for example, a series of three platforms. By mechanical linkage or by electronic load cells, as a vehicle rests on one or more of the platforms, the weight is indicated on the scale.

During the operation of the scales dirt and friction have a tendency to build up at critical points in mechanical scale mechanisms and restrict action of the pivots. When this occurs, the scale no longer accurately measures the load on the scale. Similarly, drift in the electronic components of such scales affect their calibration. In either event, the consequences are an inaccurate indication of the weight for the load or item on the scale.

Accordingly, the prior art has recognized that it is important to periodically calibrate platform scales. It is known that the calibration accuracy of the scale will vary at different loadings and with the loads placed on varying locations on the platform scale. Therefore, calibration techniques required by state agencies often require platform scales to be calibrated at the different loadings and with the loads placed at varying locations on the platform scale.

To accurately calibrate the platform scales it is therefore necessary to be able to place scale test weights on the platform scales and to move the weights to different locations on the scale. However, it is difficult and time consuming to place the scale test weights on various individual scale platforms and to move the scale test weights to various locations on the individual scale platforms. Further it is difficult to transport the scale test weights into relatively narrow, inaccessable areas which are frequently encountered when calibrating platform scales which are used to weigh livestock.

Accordingly, there is a need for a weight cart that can quickly and effectively transport scale test weights to platform scales and reposition the scale test weights on various areas of the platform scales with a minimum of difficulty. In addition, the weight cart should be highly maneuverable and compact in size to facilitate transporting the scale testing weights into confined areas.

SUMMARY OF THE INVENTION

According to the invention, there is provided a cart for transporting scale testing weights having a support member. Two plates are connected to the support member and the plates are positioned adjacent the sides of the support member. The plates extend from the support member in a direction that is substantially perpendicular to the support member. An opening is defined in the support member and the opening is located in the portion of the support member positioned between the two plates. A wheel assembly is rotatably connected to each of the plates and the wheel assemblies are in substantial alignment. The wheel assemblies moveably support the plates. A driven wheel is pivotally connected to the support member. The driven wheel is spaced apart from the plates and is in substantial alignment with the wheel assemblies on the plates. A drive means is operatively connected to the driven wheel for controlling the rotation of the driven wheel. A control handle is operatively connected to the driven wheel and the drive means. The handle controls pivotal movement of the driven wheel with respect to the support member and the rotation of the driven wheel by the drive means. A lifting means is positioned on the support member and the lifting means includes a lifting hook that extends through the opening in the support member. The lifting hook is positioned for engaging and lifting the scale testing weights.

It is an object of the invention to provide a weight cart for transporting scale testing weights.

It is also an object of the invention to provide a weight cart that is compact and highly maneuverable for transporting scale testing weights.

Other objects and advantages of the invention will become apparent as the invention is described hereinafter in detail and with reference to the accompanying drawings.

DESCRIPTION OF THE DRAWINGS

FIG. 3 is a rear elevational view of the weight cart;

FIG. 4 is a front elevational view of the weight cart;

DESCRIPTION OF THE PREFERRED EMBODIMENT

Figure 1:
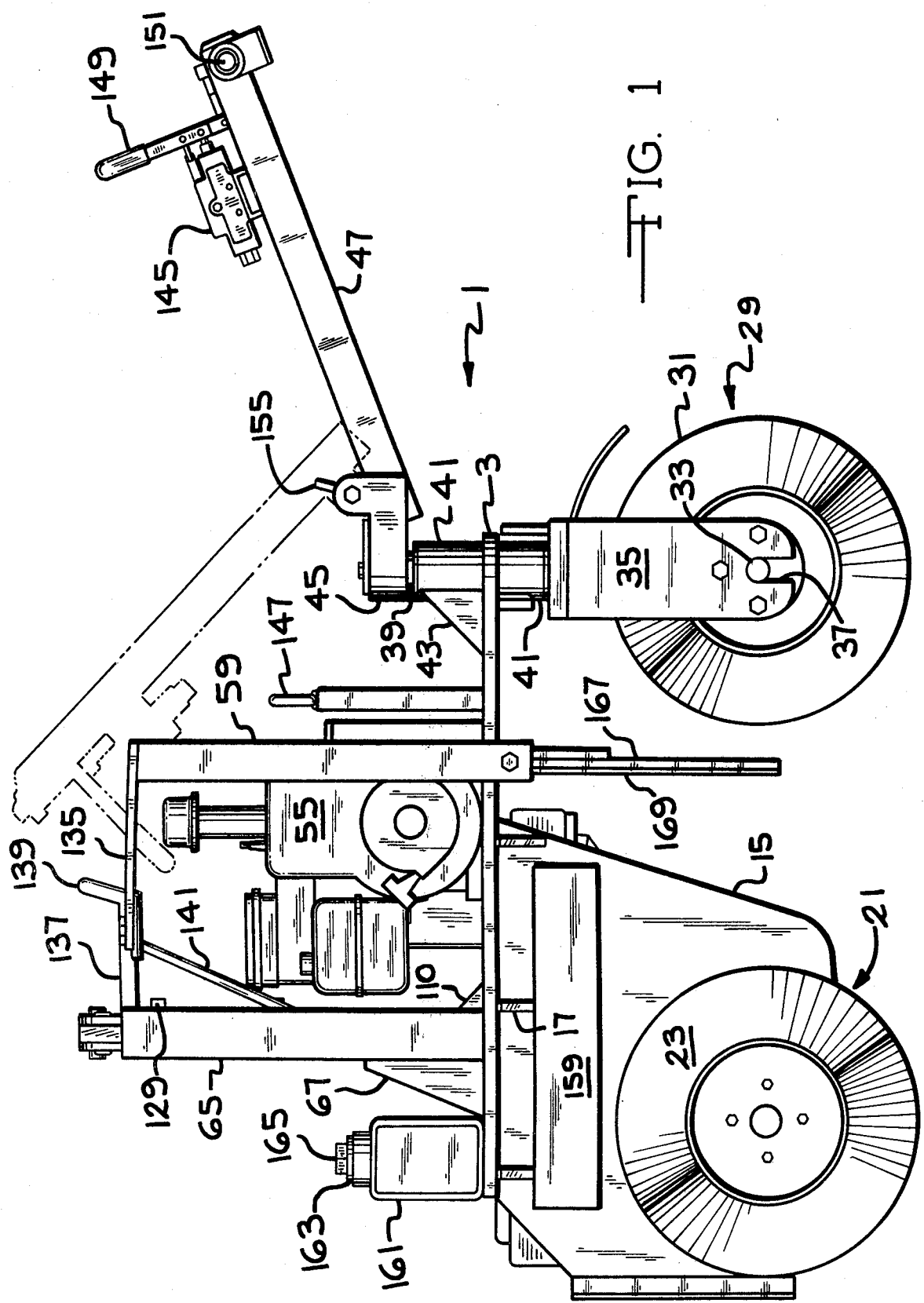
FIG. 1 is a side elevational view of the weight cart in accordance with the present invention.
Figure 2:
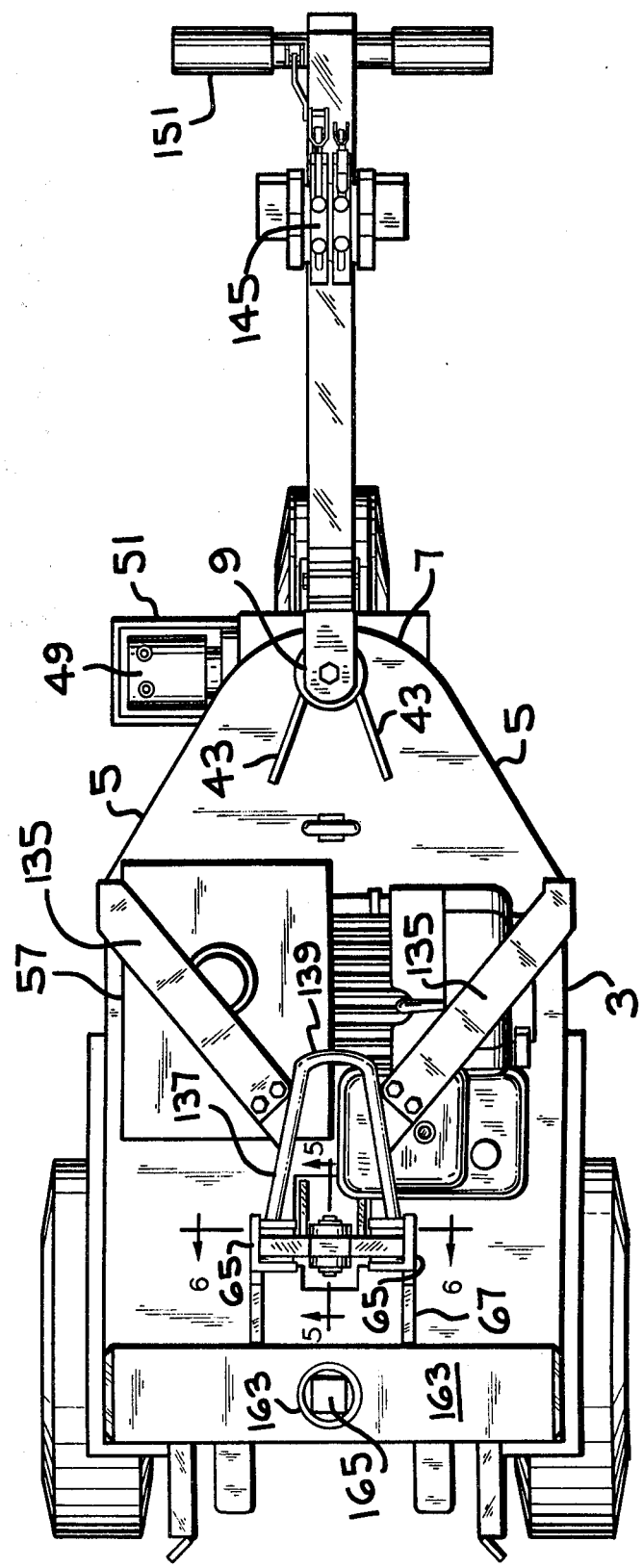
FIG. 2 is a plan view of the weight cart.

This invention relates to a weight cart for lifting and transporting scale testing weights. More particularly the invention is directed to a three-wheeled cart that can be controlled by an operator walking adjacent to the cart. The details of the invention will be more readily understood by referring to the attached drawings in connection with the following description.

The weight cart 1 has a substantially flat support member 3. The support member is positioned in a substantially horizontal plain. One end of the support member 3 has substantially converging sides 5 that terminate in a radiused section 7. An aperture 9 is located in the support member 3 adjacent the radiused section 7. The aperture 9 is positioned substantially along the center line of the support member 3. An opening 11 is positioned on the portion of the support member 3 that is spaced apart from the converging sides 5. The opening 11 is positioned substantially along the center line of the support member 3.

Connected to the support member 3 are plates 15. The plates are positioned along the sides of the support member 3 and extend from the support member in a direction that is substantially perpendicular to the support member. The plates 15 extend from the end of the support member that is opposite to the radiused end 7 to a point that is approximately at the midpoint of the support member 3. Gussetts 17 can be positioned between the support member 3 and the plates 15 to provide additional support for the plates.

Connected to the ends of the plates 15 that are spaced apart from the support member 3 are wheel assemblies 21. The wheel assemblies 21 are comprised of wheels 23 that are rotatably secured to the plates 15 by axles 25. The wheels 23 and axles 25 are positioned in substantial alignment on the opposed plates 15. The wheels and axles are secured to the exterior surface of the plates 15. The wheels 23 act to moveably support the plates 15.

Positioned in contact with the radiused section 7 of the support member 3 is a driven wheel assembly 29. The driven wheel assembly 29 comprises a wheel 31 secured to an axel 33. The wheel 31 is held in position in a fork 35 that straddles the driven wheel 31. The fork contains a u-shaped notch 37 and the axel 33 is secured to the notch. The fork 35 is connected to a shaft 39 and the shaft extends through the aperture 9 in the support member 3. The shaft 39 is rotatably supported in bearing sleeve 41 that is located adjacent both surfaces of the support member 3. Reinforcing gussetts 43 can be positioned in contact with the support member 3 and the bearing sleeves 41 to position and provide support for the bearing sleeves 41. Positioned on the end of the shaft 39 that is spaced apart from the fork 35 is a collar 45 and a handle 47 is pivotally connected to the collar. A motor 49 is operatively connected to one end of the axel 33 to provide the driving force for the driven wheel 31. The motor 49 is normally a hydraulic motor that can be connected to a source of hydraulic fluid for controlling the rotation of the driven wheel 31. However, it should be recognized that any suitable motor can be utilized for driving the wheel 31. A protective bracket 51 is positioned adjacent the motor 49 to protect the motor during the operation of the weight cart and to protect any hydraulic couplings to the motor.

Positioned on the support member 3, on the surface opposite the plates 15, is an engine 55. The engine 55 is normally connected to hydraulic pumps which are located in housings 57. However, it should be recognized that drive means other than hydraulic pumps can be utilized to operate the weight cart. Positioned on each side of the support member 3, adjacent the engine 55, are braces 59. The braces 59 extend along the edge of the support member 3 and are connected to reinforcing members 61 that are located on the lower surface of the support member. The braces 59 can be bolted to the reinforcing member or connected in any other suitable manner. The braces 59 extend from the reinforcing members in a direction substantially perpendicular to the surface of the support member. The braces extend from the reinforcing member 61 in a direction towards the engine 55 and terminate at a point above the engine 55.

Positioned on the support member 3 adjacent the opening 11 are columns 65. The columns 65 extend from the surface of the support member 3 in a direction that is substantially perpendicular to the surface of the support member. The columns are located on the surface of the support member that is opposite to the surface upon which the plates 15 are positioned. The columns 65 terminate at a point above the engine 55 and the columns are substantially the same height as the braces 59. A gussett 67 is positioned in contact with the columns 65 and the support member 3 to hold the columns in position on the support member. The columns 65 are substantially u-shaped and the open end of the u-shaped columns are in opposed relationship. Positioned in contact with the ends of the columns 65 that are spaced apart from the support member 3 is a connecting member 71. The connecting member defines a passage way 73.

A hydraulic cylinder 79 is positioned between the columns 65. One end of the hydraulic cylinder contains flanges 81 that extend from the end of the hydraulic cylinder. The flanges define apertures 83 that are in substantial alignment and that have substantially the same diameter as the passageways 73 and the connecting members 71. The flanges 81 are disposed on the hydraulic cylinder 79 to straddle the connecting member 71. When the hydraulic cylinder 79 is properly positioned between the columns 65 the aperture 83 in the flanges 81 will be in alignment with the passageway 73 in the connecting member 71. A pin 85 is positioned in the apertures 83 and the passageway 73 to secure the hydraulic cylinder 79 to the connecting member 71. A retaining pin 87 can be positioned on each end of the pin 85 to maintain the pin 85 in the proper location with respect to the connecting member 71 and the flanges 81. With the pin 85 properly positioned the columns 65 and connecting member 71 act to support the hydraulic cylinders 79.

The other end of the hydraulic cylinder 79 has a rod 91 that extends therefrom. The rod is connected to the piston (not shown) in the interior of the cylinder. Normally inlets for hydraulic fluid are provided on each end of the hydraulic cylinder 79 so that hydraulic fluid can be introduced on either side of the piston to cause the piston and rod to advance within the hydraulic cylinder.

The end of the rod 91 that extends from the hydraulic cylinder 79 is connected to a yoke 93. The yoke is generally u-shaped and an opening 95 is defined in the legs of the yoke. A flange 101 is positioned between the legs of the u-shaped yoke 93. The flange contains an aperture 103 that is substantially the same diameter as the openings 95 and the opening 93. When the flange is properly positioned in the yoke the aperture 103 will be in alignment with the opening 95. A pin 107 is positioned in the openings 95 and the aperture 103 to secure the flange 101 to the yoke 103.

The flange 101 is connected to header 109 and hooks 111 are secured to the header. The hooks 111 are positioned or disposed to engage a lifting rod 113 on a scale testing weight 115. A gussett 110 is positioned in contact with the flange 101 and the header 109 to provide additional support between the flange and the header.

Figure 6:
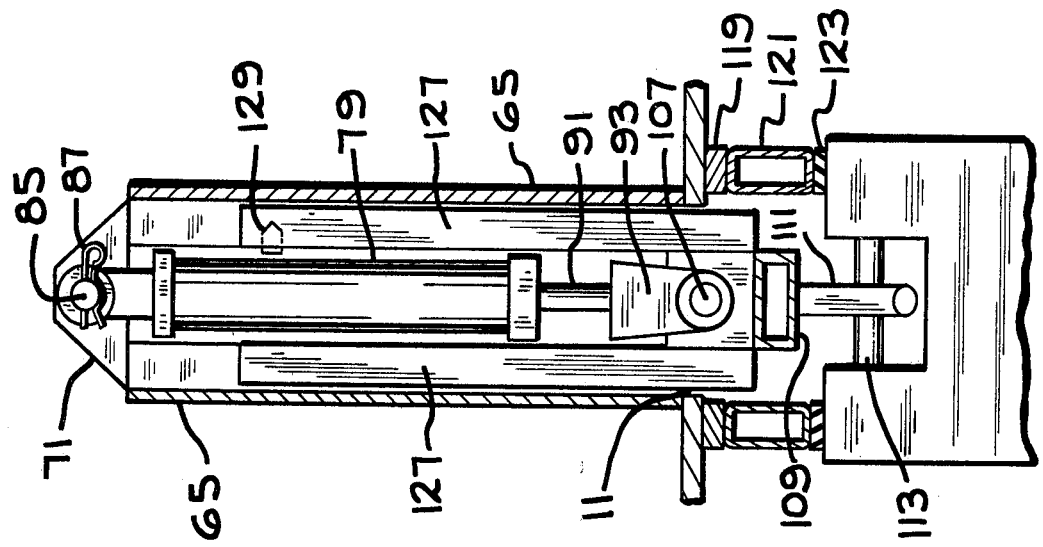
FIG. 6 is a cross-sectional view of the weight cart taken along line 6—6 of FIG. 2.
Figure 5:
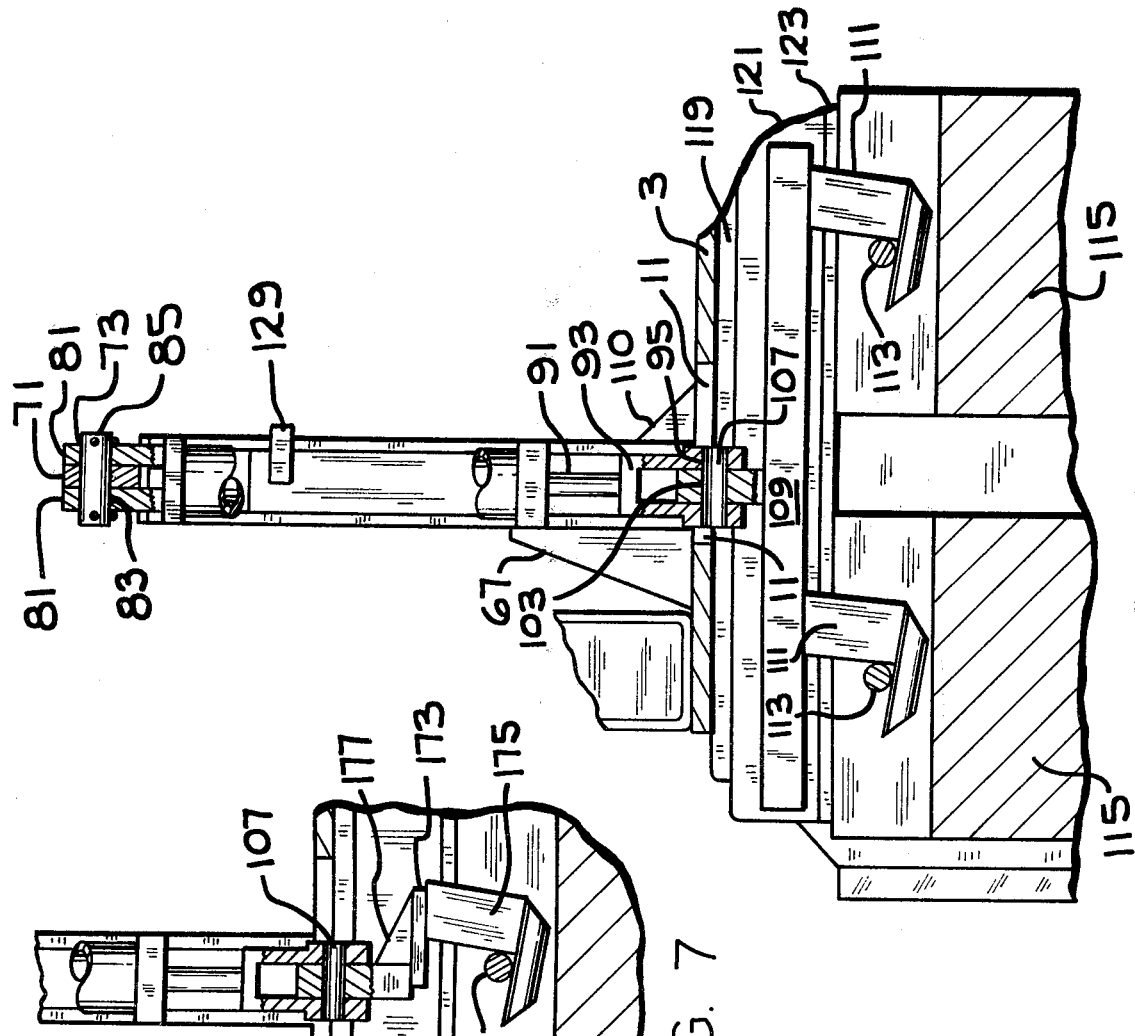
FIG. 5 is a cross-sectional view of the weight cart taken along line 5—5 in FIG. 2.

Positioned adjacent the opening 11 in the support member 3 are spacers 119. The spacers are positioned on the surface of the support member to which the plates 15 are connected. Channels 121 and bumpers 123 are connected to the spacers 119. The channels and bumpers extend from the spacers away from the support member 3. The bumpers 123 are made of a resilient material and the bumpers are positioned to engage the top of the scale testing weights as shown in FIG. 6.

Positioned adjacent the hydraulic cylinder 79 are guides 127. The guides are secured to the flange 101 and extend from the flange towards the hydraulic cylinder 79. The guides are positioned in the opening formed in the u-shaped columns 65. The guides 127 are constructed so that there is very little clearance between the sidewalls of the columns 65 and the guides. A pointer or cite guage 129 can be positioned on a portion of the guides 127.

Cross braces 135 are secured to the ends of braces 59 that are located above the engine 55. The cross braces 135 are generally converging and are secured to a lifting bar 137. The lifting bar 137 is substantially u-shaped and the open ends of the lifting bar 137 are connected to columns 65. The closed end of the lifting bar 137 is disposed at an angle with respect to the remainder of the lifting bar and forms a lifting eye 139. Additional support for the lifting bar 137 is provided by reinforcing members 141. The reinforcing members extend from the lifting bar 137 to the columns 65 to provide additional support for the lifting bar.

Controls for the weight cart 1 are located on the handle 47. A plurality of valves 145 are located on the handle. The valves are operatively connected to the hydraulic pumps in the housing 57. At least one of the plurality of valves 145 is operatively connected to the hydraulic cylinder 79 and at least one of the plurality of valves 135 is operatively connected to the drive motor 49. Normally hydraulic lines will extend from the housings 57 to the plurality of valves 145 and from the plurality of valves to the hydraulic cylinder and the drive motor. A hydraulic hose holder 147 is provided to maintain the hydraulic hoses in the proper position during the operation of the weight cart. The hydraulic valve that is connected to the hydraulic cylinder 79 is controlled by a lever 149. By advancing the lever 149 towards the hydraulic valve 145 the rod 91 of the hydraulic cylinder will be caused to advance in a direction towards the flanges 81 attached to one end of the hydraulic cylinder. By advancing the lever away from the valves 145 the rod 91 of the hydraulic cylinder 79 will be caused to advance in a direction away from the flanges 81. The hydraulic valve 145 that operates the drive motor 49 is controlled by rotatable handlebar grips 151. The rotatable grips 151 are positioned at the end of the handle 47 that is spaced apart from the collar 45 and the grips are substantially perpendicular to the handle 47. Rotation of the grips 151 in a clockwise direction from the position shown in FIG. 1 will cause the weight cart to advance in a forward direction. Rotation of the grips 151 in a counterclockwise direction will cause the weight cart to advance in a rearward or reverse direction.

The handle 47 is pivotally connected to the collar 45 so that the handle can be pivoted to the position shown in broken lines in FIG. 1 when the weight cart is not in use. A tab 155 has been provided on the handle adjacent the collar 45 to restrict the pivotal movement of the handle 47.

During the use of the weight cart 1 it is necessary to have the weight cart properly calibrated so that the weight cart is properly balanced and the proper weight for use in scale testing. Accordingly, weights 159 have been secured to each of the plates 15 to assist in balancing the weight cart. In addition, container 161 is positioned on the support member 3. The container 161 has an opening 163 on the side of the container that is spaced apart from the support member 3 and a cap 165 is provided to removably seal the opening 163. The container 161 is designed to receive ballast, normally in the form of lead or steal shot, that can be added or removed from the container to balance the weight cart.

A bumper or stop 167 is connected to the support member 3 and extends from the support member in a direction that is substantially perpendicular to the support member. The stop 167 extends from the support member in the same direction as the plates 15. The stop terminates at a point that is substantially in alignment with the wheels 23 and driven wheel 31. A resilient surface 169 is provided on the surface of the stop that faces the plates 15. The stop 167 extends substantially across the entire width of the driven wheel 31. The stop 167 is positioned to prevent a scale testing weight 115 positioned on the hooks 111 from coming into contact with the driven wheel 31.

Figure 7:
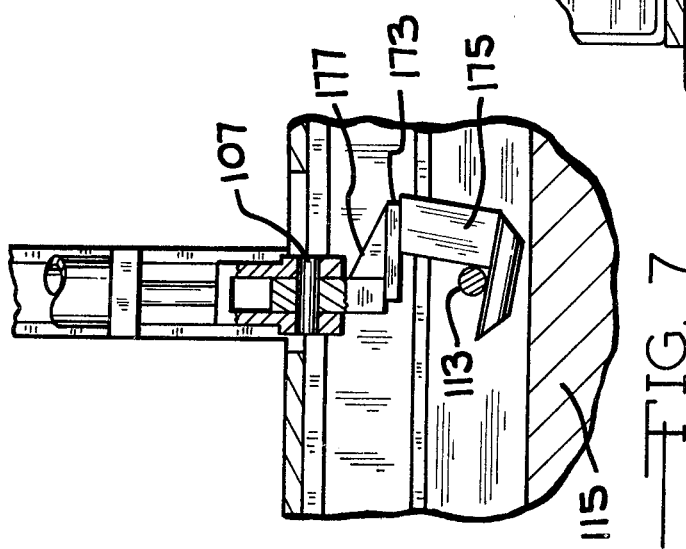
FIG. 7 is a partial cross sectional view of another embodiment for the weight cart of the present invention.

FIG. 7 shows another embodiment for a lifting hook to be used with the weight cart of the present invention. In this embodiment a hydraulic cylinder 79 is supported on column 65. A rod 91 extends from the hydraulic cylinder and terminates in a yolk 93. A flange 101 is connected to the yolk by means of a pin 107. The hydraulic cylinder 79, rod 91, yolk 93, flange 101 and pin 107 are all connected in the manner previously described. On the end of the flange 101 that extends from the yolk 93 there is a header 173. The header 173 is positioned substantially perpendicular to the support member 3. Connected to the header 173 is a single lifting hook 175. The lifting hook has substantially the same configuration as the previously described hook 111. The lifting hook 175 is disposed for engaging the lifting rod 113 on a scale testing weight 115. A gussett 177 can be positioned between the flange 101 and the header 173 to provide additional support for the lifting hook 175.

The operation of the weight cart will be more readily understood by referring to the attached drawings in connection with the folowing description. The weight cart 1 is designed to be transported in the back of a tractor trailer rig in which the scale testing weights 115 are also transported. When the scale testing cart is being transported the handle 47 is placed in the position shown in broken lines in FIG. 1. When the tractor trailer rig is at the location where the weight cart is to be utilized a lifting device can be attached to the lifting eye 139 and the weight cart unloaded from the trailer. When the weight cart is suspended on the lifting eye 139 the ballast in container 161 can be varied to ensure that the weight cart is properly balanced. When the weight cart is positioned on the ground the handle 47 is unfolded and the engine 55 is started to supply hydralic fluid to the hydraulic pump located in housing 57. Hydraulic fluid will then be supplied to the control valve 145 that controls the operation of the weight cart.

After scale testing weights 115 have also been unloaded from the trailer the handle grips 151 can be rotated by an operator and the driven wheel 31 steered by the rotation of the handle 47 to position the weight cart with respect to the scale testing weights. Normally the scale testing weights 115 are positioned between the opposed plates 15 on the weight cart. Then the lever 149 can be advanced to operate the hydraulic cylinder 79 to position the hooks 111 in the proper position to engage the lifting rods 113 on the scale testing weights 115. The weight cart can then be positioned to place the hooks 111 adjacent the rods 113. The lever 149 can then be advanced to cause the rod 91 of the hydraulic cylinder 79 to advance towards the flanges 81. This will result in the hooks 111 engaging the rods 113 and the scale testing weights 115 being lifted by the hydraulic cylinder. Normally the rod 91 will be advanced until the portion of the scale testing weights 115 adjacent the rod 113 is in contact with the bumpers 123. In this position the scale testing weights will be secured against the bumper and the weight cart will be properly prepared for transporting the scale testing weights. With the scale testing weights in position against the bumpers 123 an operator can drive the scale testing cart by rotating the grips 151 and pivoting the handle 47 to advance and steer the weight cart to the proper location for testing a particular scale.

During the transporting of the scale testing weights loads will be imparted to the hooks 111, header 109, flange 101, yoke 93, rod 91 and hydraulic cylinder 79. However, guides 127 are positioned adjacent the flange 101 and hydraulic cylinder 79 to prevent unwanted deflection or movement in the hydraulic lifting mechanism. In addition, the stop 167 will prevent the scale testing weights 115 from advancing towards the driven wheel 31 and engaging or contacting the driven wheel.

To disengage the hooks 111 from the scale testing weights 115 the lever 149 is advanced to cause the rod 91 to move away from the flanges 81. The weights 115 are lowered until they are resting on the ground and the hooks 111 no longer engage the lifting rods 113 on the weights. Then the grips 151 can be rotated to cause the driven wheel 31 to be rotated to advance the weight cart out of engagement with the scale testing weights 115.

A pointer 129 can be attached to the guide 127 to assist the operator in determining the position of th hooks 111. Additional marks can be provided on the column 65 so that the operator will know when the hooks 111 are in position to pass under the lifting rods 113, when the hooks have engaged and lifted the weights 115, when the weights are in position against the bumpers 123 and when the hooks are in the full upward position and not engaging the lifting rods of the scale testing weights.

Having described the invention in detail and with reference to the attached drawings it should be understood that such specifications are given only for the sake of explanation. Various modifications and substitutions, other than those cited, can be made without departing from the scope of the following claims.

What I claim is:

1. A cart for transporting scale testing weight comprising:
   a support member;
   two plates connected to said support member, said plates positioned adjacent the sides of said support member, said plates extending from said support member in a direction substantially perpendicular to said support member;
   an opening defined in said support member;
   a wheel assembly rotatably connected to each of said plates, said wheel assembly moveably supporting said plates;
   a driven wheel pivotally connected to said support member, said driven wheel being spaced apart from said plates, said driven wheel moveably supporting one end of said support member;
   a drive means operatively connected to said driven wheel, said drive means controlling the rotation of said driven wheel;
   a control handle operatively connected to said driven wheel and said drive means, said handle controlling the pivotal movement of said driven wheel with respect to said support member and the rotation of said driven wheel by said drive means; and
   a lifting means positioned on said support member, said lifting means including at least one lifting hook that extends through said opening in said support member, said lifting hook being positioned for engaging said lifting scale testing weights.

2. The cart of claim 1 wherein a control valve is positioned on said handle for controlling the operation of said hdyraulic cylinder, a lever being operatively connected to said valve to control the operation of said valve.

3. The cart of claim 1 wherein a stop is connected to said support member, said stop extending from said support member in the same direction as said plates, said stop being positioned between said wheel assemblies and said driven wheel, said stop acting to prevent a scale testing weight positioned on said lifting hook from engaging said driven wheel.

4. The cart of claim 1 wherein ballast weights are positioned on said plates.

5. The cart of claim 1 wherein a container having a closeable opening is positioned on said support member, said container being disposed for receiving particulate ballast.

6. The cart of claim 1 wherein a hydraulic motor is operatively connected to said driven wheel.

7. The cart of claim 6 wherein a control valve is positioned on said handle for controlling the operation of said motor, a rotatable grip being positioned on said handle, said rotatable grip being operatively connected to said valve to control the operation of said valve.

8. The cart of claim 1 wherein said lifting means includes a hydraulic cylinder that is operatively connected to said lifting hook.

9. The cart of claim 8 wherein columns are positioned on said support member adjacent said opening, said columns acting to support said hydraulic cylinder.

10. The cart of claim 8 wherein guides are positioned between said columns and said hydraulic cylinders, said guides acting to stabilize and prevent deflection of said hydraulic cylinder and lifting hook.

11. The cart of claim 9 wherein a brace is positioned along each side of said support member, said braces extending from said support member, said braces extending from said support member in the same direction as said columns, a lifting eye being positioned between and connected to said columns and said braces, said lifting eye being positioned for lifting and transporting said cart.

12. The cart of claim 11 wherein said handle is pivotally connected to said driven wheel whereby said handle can be pivoted and positioned adjacent said braces when said cart is being transported.

* * * * *